(12) United States Patent
Sabert et al.

(10) Patent No.: US 11,372,154 B2
(45) Date of Patent: Jun. 28, 2022

(54) METHOD, ASSEMBLY, AND APPARATUS FOR IMPROVED CONTROL OF BROADBAND RADIATION GENERATION

(71) Applicant: ASML NETHERLANDS B.V., Veldhoven (NL)

(72) Inventors: Hendrik Sabert, London (GB); Patrick Sebastian Uebel, Marloffstein (DE); Willem Richard Pongers, Veldhoven (NL)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 17/128,360

(22) Filed: Dec. 21, 2020

(65) Prior Publication Data
US 2021/0215872 A1     Jul. 15, 2021

(30) Foreign Application Priority Data

Jan. 15, 2020  (EP) .................................... 20151863
Feb. 12, 2020  (EP) .................................... 20156804

(51) Int. Cl.
*G02B 6/02*     (2006.01)
*G01B 11/25*    (2006.01)

(52) U.S. Cl.
CPC ..... *G02B 6/02328* (2013.01); *G02B 6/02214* (2013.01); *G01B 11/25* (2013.01)

(58) Field of Classification Search
CPC ................................................ G02B 6/02214
See application file for complete search history.

(56) References Cited

U.S. PATENT DOCUMENTS 6,952,253 B2   10/2005   Lof et al.
6,961,116 B2   11/2005   Den Boef et al.
7,265,364 B2    9/2007   Teunissen et al.
(Continued)

FOREIGN PATENT DOCUMENTS

CN    103022880    4/2013
CN    106405727    2/2017
(Continued)

OTHER PUBLICATIONS

B. Debord et al., "Plasma photonics in hollow-core photonic crystal fibers," 2013 15th International Conference on Transparent Optical Networks (ICTON), 2013, pp. 1-1, doi: 10.1109/ICTON.2013.6602965. (Year: 2013).*

(Continued)

*Primary Examiner* — Rhonda S Peace
(74) *Attorney, Agent, or Firm* — Pillsbury Winthrop Shaw Pittman LLP

(57) ABSTRACT

A hollow-core photonic crystal fiber (HC-PCF) assembly for converting input radiation to broadband radiation, the hollow core fiber assembly including: a micro-structured fiber with a hollow core extending along a length of the fiber from an input end configured to receive input radiation to an output end configured to output broadband radiation, wherein the hollow core of the fiber is configured to include a medium; and a density control system configured to control a density profile of the medium along at least a part of the length of the fiber to establish a desired zero dispersion wavelength profile along at least a part of the length of the fiber.

23 Claims, 5 Drawing Sheets

(56) References Cited

U.S. PATENT DOCUMENTS

| | | | |
|---|---|---|---|
| 7,646,471 | B2 | 1/2010 | Teunissen et al. |
| 10,690,995 | B2* | 6/2020 | Kumar ................ G03F 9/7065 |
| 10,693,271 | B2* | 6/2020 | Uebel ................ G02B 6/02328 |
| 10,969,542 | B2* | 4/2021 | Sabert ................ G03F 7/70616 |
| 2007/0296960 | A1 | 12/2007 | Den Boef et al. |
| 2008/0198380 | A1 | 8/2008 | Straaijer et al. |
| 2009/0168062 | A1 | 7/2009 | Straaijer |
| 2009/0195768 | A1 | 8/2009 | Bijnen et al. |
| 2010/0007863 | A1 | 1/2010 | Jordanoska |
| 2010/0233600 | A1 | 9/2010 | Den Boef et al. |
| 2010/0328655 | A1 | 12/2010 | Den Boef |
| 2011/0026032 | A1 | 2/2011 | Den Boef et al. |
| 2011/0032500 | A1 | 2/2011 | Straaijer |
| 2011/0102753 | A1 | 5/2011 | Van De Kerkhof et al. |
| 2011/0102793 | A1 | 5/2011 | Straaijer |
| 2011/0188020 | A1 | 8/2011 | Den Boef |
| 2011/0249244 | A1 | 10/2011 | Leewis et al. |
| 2012/0044470 | A1 | 2/2012 | Smilde et al. |
| 2012/0044495 | A1 | 2/2012 | Straaijer |
| 2013/0162996 | A1 | 6/2013 | Straaijer et al. |
| 2013/0308142 | A1 | 11/2013 | Straaijer |
| 2014/0334763 | A1* | 11/2014 | Holzer ................ H01S 3/0057 385/1 |
| 2015/0261097 | A1 | 9/2015 | Mathijssen et al. |
| 2016/0161863 | A1 | 6/2016 | Den Boef et al. |
| 2016/0370717 | A1 | 12/2016 | Den Boef et al. |
| 2021/0026255 | A1* | 1/2021 | Uebel ................ G02B 6/02328 |
| 2021/0124112 | A1* | 4/2021 | Uebel ................ G02B 6/02328 |
| 2021/0215872 | A1* | 7/2021 | Sabert ................ G02F 1/3528 |
| 2021/0364885 | A1* | 11/2021 | Bauerschmidt ....... G02F 1/3515 |
| 2021/0387892 | A1* | 12/2021 | Van Leeuwen ......... C03C 25/68 |

FOREIGN PATENT DOCUMENTS

| | | | |
|---|---|---|---|
| EP | 1628164 | 2/2006 | |
| EP | 3839586 A1 * | 6/2021 | ......... G02B 6/02385 |
| NL | 2023533 | 8/2019 | |
| TW | 455709 | 9/2001 | |
| WO | 2011012624 | 2/2011 | |
| WO | 2016102127 | 6/2016 | |

OTHER PUBLICATIONS

Extended European Search Report issued in corresponding European Patent Application No. 20213776.6, dated May 5, 2021.

International Search Report and Written Opinion issued in corresponding PCT Patent Application No. PCT/EP2020/085965, dated Mar. 22, 2021.

European Search Report issued in corresponding European Patent Application No. 201568045, dated Jul. 23, 2020.

Song, Z. et al.: "Femtosecond pulse propagation in temperature controlled gas-filled hollow fiber", Optics Communications, vol. 281, No. 15-16, Aug. 1, 2008.

Song, Z. et al.: "Simulation of Femtosecond Pulse Propagation through Hollow Fibre Filled with Noble Gases of Gradient Temperature", Institute of Physics Publishing, vol. 25, No. 1, Jan. 1, 2008.

* cited by examiner

METHOD, ASSEMBLY, AND APPARATUS FOR IMPROVED CONTROL OF BROADBAND RADIATION GENERATION

This application claims the benefit of priority of European patent application no. 20156804.5, filed Feb. 12, 2020, and of European patent application no. 20151863.6, filed Jan. 15, 2020, each of which is incorporated herein in its entirety.

FIELD

The present description relates to methods, assemblies, and apparatus for converting input radiation to broadband radiation. In particular, it relates to, for example, controlling a density profile of a medium inside a fiber.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD=k_1 \times \lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low k1.

In the field of lithography, many different measurements systems may be used to obtain information about a lithographically patterned structures on substrates. Metrology may for example be used for inspection of the lithographically patterned structures, and analysis of the associated lithographic patterning processes. Measurements systems may use radiation to interrogate a structure on a substrate, for example electromagnetic radiation. Due to the small dimensions of the patterned features, properties of the radiation used for inspecting and measuring properties of substrates and structures patterned thereon may affect what kind of information may be obtained by those measurements. Different wavelengths of radiation may be suitable for measuring different properties on the substrate. Furthermore, the quality of the beam may affect the quality of the resulting measurements. Radiation properties that may affect the measurement results may for example include the size and shape of the radiation beam, intensity of the radiation, and/or the wavelength(s) of the radiation. The wavelength and/or beam size may for example affect the smallest feature that can be distinguished in a measurement. Different materials and/or structures may also have wavelength dependent reactions (e.g. due to absorption, transmission, interference effects, etc.). It is therefore desirable to have access to one or more radiation sources able to provide desired radiation wavelengths and/or beam properties.

SUMMARY

According to an aspect of the disclosure, there is provided a hollow-core photonic crystal fiber (HC-PCF) assembly for converting input radiation to broadband radiation, the hollow core fiber assembly comprising: a micro-structured fiber with a hollow core extending along a length of the fiber from an input end configured to receive input radiation to an output end configured to output broadband radiation, wherein the hollow core of the fiber is configured to comprise a medium; and a density control system configured to control a density profile of the medium along at least a part of the length of the fiber to establish a desired zero dispersion wavelength profile along at least a part of the length of the fiber.

Optionally, the desired zero dispersion wavelength profile is configured to enhance soliton trapping.

Optionally, the desired zero dispersion wavelength profile is configured to extend the wavelength range of the broadband radiation generated by modulation instability.

Optionally, the desired zero dispersion wavelength profile is configured to enhance interaction between solitons and dispersive waves generated by the HC-PCF when receiving the input radiation.

Optionally, the desired zero dispersion wavelength profile is configured to enhance conversion efficiency of the HC-PCF.

Optionally, the broadband radiation has a continuous range of wavelengths between 350 nm to 2000 nm.

Optionally, the density profile along the at least a part of the length of the fiber is a negative gradient profile.

Optionally, the density control system comprises a temperature control system configured to control a temperature along the at least a part of the length of the fiber.

Optionally, the cross-sectional width (e.g., diameter) of the hollow core is varied along the at least a part of the length of the fiber.

Optionally, the cross-sectional width of the hollow core is decreased along the at least a part of the length of the fiber.

Optionally, the medium comprises at least one selected from: helium, neon, argon, krypton, xenon, $O_2$ gas, $N_2$ gas.

Optionally, the hollow-core fiber is a single ring photonic crystal fiber.

Optionally, the hollow-core fiber comprises a single ring of capillaries surrounding a hollow core.

Optionally, the broadband radiation comprises supercontinuum radiation.

Optionally, the broadband radiation comprises one or more wavelengths in the range of 350 nm to 3000 nm.

According to an aspect of the disclosure, there is provided a radiation source for outputting broadband radiation comprising a hollow-core fiber assembly as described herein, and a pump radiation source configured to couple radiation at a pump wavelength into the hollow-core fiber for generating broadband radiation inside the fiber.

According to an aspect of the disclosure, there is provided a method for converting input radiation to broadband radiation, the method comprising: providing a micro-structured fiber with a hollow core extending along a length of the fiber from an input end to an output end, wherein the hollow core of the fiber comprises a medium; directing input radiation into the hollow core fiber at the input end; controlling a density profile of the medium along at least a part of the length of the fiber to establish a desired zero dispersion wavelength profile along at least a part of the length of the fiber; and outputting broadband radiation at the output end.

Optionally, controlling the density profile comprises setting a negative gradient profile along the at least a part of the length of the fiber.

Optionally, controlling the density profile comprises controlling a temperature along the at least a part of the length of the fiber.

According to an aspect of the disclosure, there is provide a metrology arrangement comprising a radiation source as described herein.

According to an aspect of the disclosure, there is provided an inspection tool comprising a metrology arrangement as described herein.

According to an aspect of the disclosure, there is provided a metrology tool comprising a metrology arrangement as described herein.

According to an aspect of the disclosure, there is provided a lithographic apparatus comprising a metrology arrangement as described herein.

According to an aspect of the disclosure, there is provided a lithographic cell comprising a metrology arrangement as described herein.

BRIEF DESCRIPTION OF THE DRAWINGS

Embodiments of the invention will now be described, by way of example only, with reference to the accompanying schematic drawings, in which.

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective, binary, phase-shifting, hybrid, etc.), examples of other such patterning devices include a programmable mirror array and a programmable LCD array.

Figure 1:
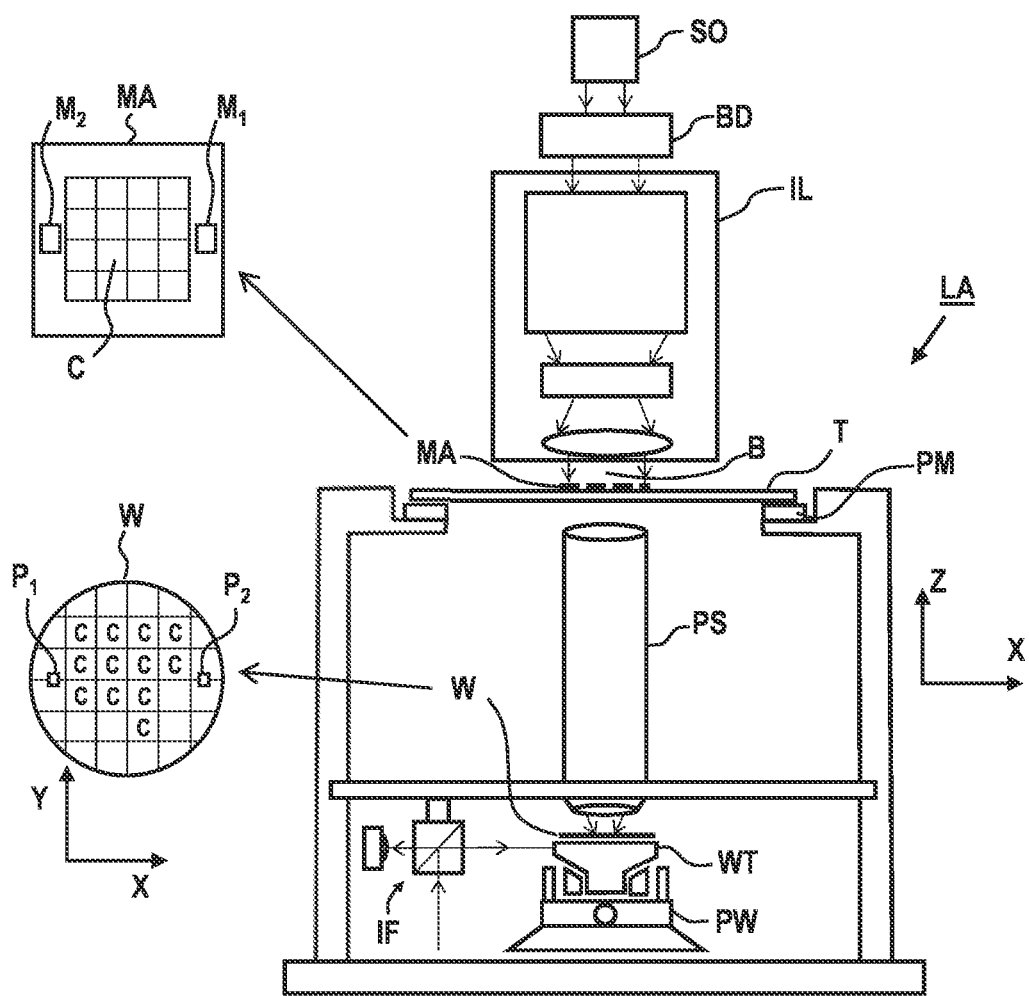
FIG. 1 depicts a schematic overview of a lithographic apparatus.

FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a patterning device support (e.g., a mask table) T constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein in its entirety by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the patterning device support T, and is patterned by the pattern (design layout) present on patterning device MA. Having traversed the patterning device MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using patterning device alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

Figure 2:
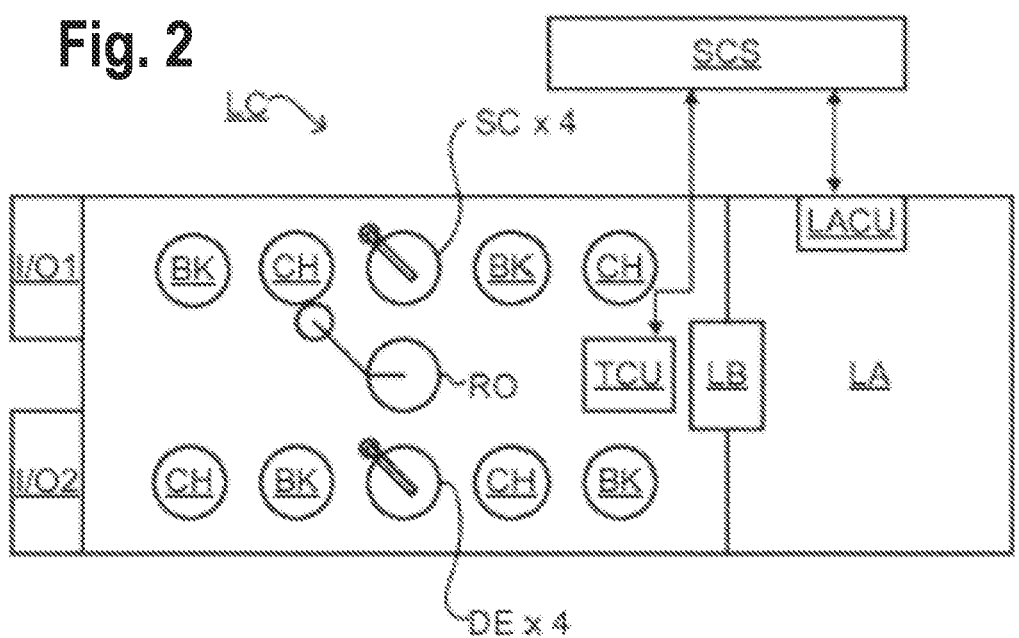
FIG. 2 depicts a schematic overview of a lithographic cell.

As shown in FIG. 2 the lithographic apparatus LA may form part of a lithographic cell LC, also sometimes referred to as a lithocell or (litho)cluster, which often also includes apparatus to perform pre- and post-exposure processes on a substrate W. Conventionally these include spin coaters SC to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, one or more inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine one or more properties of the substrates W, and in particular, how one or more properties of different substrates W vary or how one or more properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure one or more properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 3:
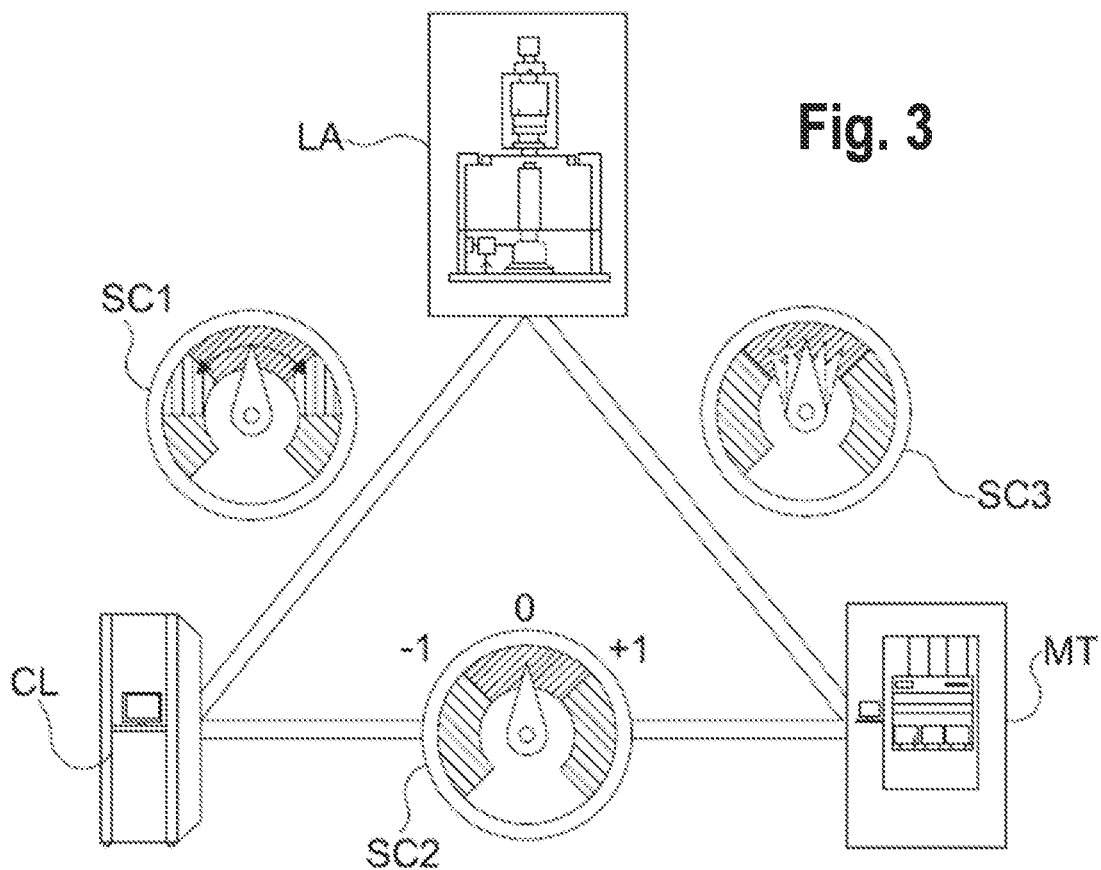
FIG. 3 depicts a schematic overview of holistic lithography, representing a cooperation between various technologies to optimize semiconductor manufacturing.

Typically the patterning process in a lithographic apparatus LA is a significant step in the processing which involves high accuracy of dimensioning and placement of structures on the substrate W. To help ensure this high accuracy, systems may be combined in a so called "holistic" control environment as schematically depicted in FIG. 3. One of these systems is the lithographic apparatus LA which is (virtually) connected to a metrology tool MT (a second system) and to a computer system CL (a third system). A desire of such "holistic" environment is to optimize the cooperation between these systems to enhance the overall process window and provide tight control loops to help ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) the design layout to be patterned to predict which one or more resolution enhancement techniques to use and to perform computational lithography simulations and calculations to determine which patterning device layout and lithographic apparatus settings achieve the largest overall process window of the patterning process (depicted in FIG. 3 by the double arrow in the first scale SC1). Typically, the one or more resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 3 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

In lithographic processes, it is desirable to make frequently measurements of the structures created, e.g., for process control and verification. Tools to make such measurement are typically called metrology tools MT. Different types of metrology tools MT for making such measurements are known, including scanning electron microscopes or various forms of scatterometer metrology tools MT. Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Such scatterometers and the associated measurement techniques are further described in U.S. Patent Application Publication Nos. US20100328655, US2011102753, US20120044470, US20110249244, and US20110026032 and European Patent Application Publication No. EP1,628,164, each of the foregoing patent publications is incorporated herein in its entirety by reference. Aforementioned metrology tools may measure gratings using radiation from soft x-ray and visible to near-IR wavelength range.

In a first embodiment, the scatterometer MT is an angular resolved scatterometer. In such a scatterometer, reconstruction methods may be applied to the measured signal to reconstruct or calculate one or more properties of the grating. Such reconstruction may, for example, result from simulating interaction of scattered radiation with a mathematical model of the target structure and comparing the simulation results with those of a measurement. One or more parameters of the mathematical model are adjusted until the simulated interaction produces a diffraction pattern similar to that observed from the real target.

In a second embodiment, the scatterometer MT is a spectroscopic scatterometer MT. In such spectroscopic scatterometer MT, the radiation emitted by a radiation source is directed onto the target and the reflected or scattered radiation from the target is directed to a spectrometer detector, which measures a spectrum (i.e. a measurement of intensity as a function of wavelength) of the specular reflected radiation. From this data, the structure or profile of the target giving rise to the detected spectrum may be reconstructed, e.g. by Rigorous Coupled Wave Analysis and non-linear regression or by comparison with a library of simulated spectra.

In a third embodiment, the scatterometer MT is an ellipsometric scatterometer. The ellipsometric scatterometer allows for determining one or more parameters of a lithographic process by measuring scattered radiation for each polarization state. Such a metrology apparatus emits polarized radiation (such as linear, circular, or elliptic) by using, for example, one or more appropriate polarization filters in the illumination section of the metrology apparatus. A source suitable for the metrology apparatus may provide polarized radiation as well. Various embodiments of existing ellipsometric scatterometers are described in U.S. Patent Application Publication Nos. 2007-0296960, 2008-0198380, 2009-0168062, 2010-0007863, 2011-0032500, 2011-0102793, 2011-0188020, 2012-0044495, 2013-0162996 and 2013-0308142, each of which is incorporated herein in its entirety by reference.

Examples of known scatterometers often rely on provision of one or more dedicated metrology targets, such as one or more underfilled targets (a target, in the form of a simple grating or overlapping gratings in different layers, that is large enough that a measurement beam generates a spot that is smaller than the grating) or overfilled targets (whereby the illumination spot partially or completely contains the target). Further, the use of a metrology tool, for example an angular resolved scatterometer illuminating an underfilled target, such as a grating, allows the use of so-called reconstruction methods where one or more properties of the grating can be calculated by simulating interaction of scattered radiation with a mathematical model of the target structure and comparing the simulation results with those of a measurement. One or more parameters of the model are adjusted until the simulated interaction produces a diffraction pattern similar to that observed from the real target.

In one embodiment of the scatterometer MT, the scatterometer MT is adapted to measure the overlay of two misaligned gratings or periodic structures by measuring asymmetry in the reflected spectrum and/or the detection configuration, the asymmetry being related to the extent of the overlay. The two (typically overlapping) grating structures may be applied in two different layers (not necessarily consecutive layers), and may be formed substantially at the same position on the substrate. The scatterometer may have a symmetrical detection configuration as described e.g. in European Patent Application Publication No. EP1,628,164, which is incorporated herein in its entirety, such that any asymmetry is clearly distinguishable. This provides a straightforward way to measure misalignment in gratings. Further examples for measuring overlay error between the two layers containing periodic structures as a target through asymmetry of the periodic structures may be found in PCT Patent Application Publication No. WO 2011/012624 and U.S. Patent Application Publication No. US 20160161863, each of which is incorporated herein in its entirety by reference.

Other parameters of interest may be focus and/or dose. Focus and dose may be determined simultaneously by scatterometry (or alternatively by scanning electron microscopy) as described in U.S. Patent Application Publication No. US2011-0249244, incorporated herein in its entirety by reference. A single structure may be used which has a unique combination of critical dimension and sidewall angle measurements for each point in a focus energy matrix (FEM—also referred to as Focus Exposure Matrix). If these unique combinations of critical dimension and sidewall angle are available, focus and/or dose values may be uniquely determined from these measurements.

A metrology target may be an ensemble of composite gratings, formed by a lithographic process, mostly in resist, but also after an etch process for example. Typically the pitch and line-width of the structures in the gratings strongly depend on the measurement optics (in particular the numerical aperture (NA) of the optics) to be able to capture diffraction orders coming from the metrology targets. As indicated earlier, the diffracted signal may be used to determine shifts between two layers (also referred to as 'overlay') or may be used to reconstruct at least part of the original grating as produced by the lithographic process. This reconstruction may be used to provide guidance of the quality of the lithographic process and may be used to control at least part of the lithographic process. Targets may have smaller sub-segmentation, which are configured to mimic dimensions of the functional part of the design layout in a target. Due to this sub-segmentation, the targets will behave more similarly to a functional part of the design layout such that the overall process parameter measurements resemble the functional part of the design layout better. The targets may be measured in an underfilled mode or in an overfilled mode. In the underfilled mode, the measurement beam generates a spot that is smaller than the overall target. In the overfilled mode, the measurement beam generates a spot that is larger than the overall target. In such overfilled mode, it may also be possible to measure different targets simultaneously, thus determining different processing parameters at the same time.

Overall measurement quality of a lithographic parameter using a specific target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in U.S. Patent Application Publication Nos. US2016-0161863 and US 2016/0370717, each of which is incorporated herein in its entirety by reference.

Figure 4:
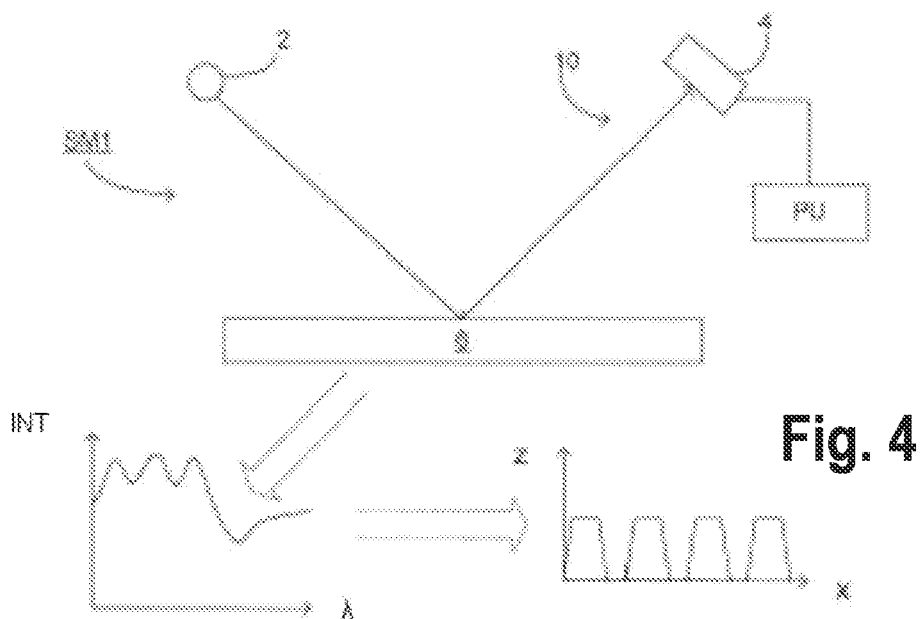
FIG. 4 depicts a schematic representation of a scatterometer.

A metrology apparatus, such as a scatterometer SM1, is depicted in FIG. 4. It comprises a broadband (e.g., white light) radiation projector 2 which projects radiation onto a substrate 6. The reflected or scattered radiation is passed to a spectrometer detector 4, which measures a spectrum 10 (i.e. a measurement of intensity INT as a function of wavelength $\lambda$) of the specular reflected radiation. From this data, the structure or profile giving rise to the detected spectrum may be reconstructed by processing unit PU, e.g. by Rigorous Coupled Wave Analysis and non-linear regression or by comparison with a library of simulated spectra as shown at the bottom of FIG. 4. In general, for the reconstruction, the general form of the structure is known and some parameters are assumed from knowledge of the process by which the structure was made, leaving only a few parameters of the structure to be determined from the scatterometry data. Such a scatterometer may be configured as a normal-incidence scatterometer or an oblique-incidence scatterometer.

A topography measurement system, level sensor or height sensor, and which may be integrated in the lithographic apparatus, is arranged to measure a topography of a top surface of a substrate (or wafer). A map of the topography of the substrate, also referred to as height map, may be generated from these measurements indicating a height of the substrate as a function of the position on the substrate. This height map may subsequently be used to correct the position of the substrate during transfer of the pattern on the substrate, in order to provide an aerial image of the patterning device in a properly focus position on the substrate. It will be understood that "height" in this context refers to a dimension broadly out of the plane to the substrate (also referred to as Z-axis). Typically, the level or height sensor performs measurements at a fixed location (relative to its own optical system) and a relative movement between the substrate and the optical system of the level or height sensor results in height measurements at locations across the substrate.

Figure 5:
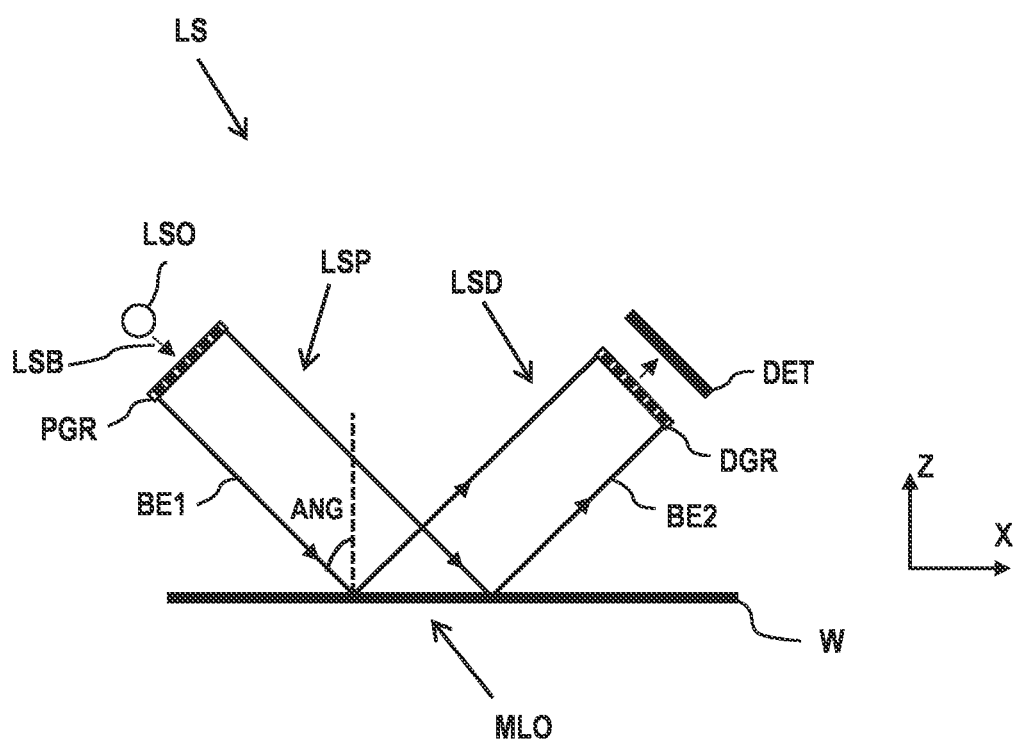
FIG. 5 depicts a schematic representation of a level sensor.

An example of a level or height sensor LS as known in the art is schematically shown in FIG. 5, which illustrates only the principles of operation. In this example, the level sensor comprises an optical system, which includes a projection unit LSP and a detection unit LSD. The projection unit LSP comprises a radiation source LSO providing a beam of radiation LSB which is imparted by a projection grating PGR of the projection unit LSP. The radiation source LSO may be, for example, a narrowband or broadband radiation source, such as a supercontinuum radiation source, polarized or non-polarized, pulsed or continuous, such as a polarized or non-polarized laser beam. The radiation source LSO may include a plurality of radiation sources having different colors, or wavelength ranges, such as a plurality of LEDs. The radiation source LSO of the level sensor LS is not restricted to visible radiation, but may additionally or alternatively encompass UV and/or IR radiation and any range of wavelengths suitable to reflect from a surface of a substrate.

The projection grating PGR is a periodic grating comprising a periodic structure resulting in a beam of radiation BE1 having a periodically varying intensity. The beam of radiation BE1 with the periodically varying intensity is directed towards a measurement location MLO on a substrate W having an angle of incidence ANG with respect to an axis perpendicular (Z-axis) to the incident substrate surface between 0 degrees and 90 degrees, typically between 70 degrees and 80 degrees. At the measurement location MLO, the patterned beam of radiation BE1 is reflected by the substrate W (indicated by arrows BE2) and directed towards the detection unit LSD.

In order to determine the height level at the measurement location MLO, the level sensor further comprises a detection system comprising a detection grating DGR, a detector DET and a processing unit (not shown) for processing an output signal of the detector DET. The detection grating DGR may be identical to the projection grating PGR. The detector DET produces a detector output signal indicative of the radiation received, for example indicative of the intensity of the radiation received, such as a photodetector, or representative of a spatial distribution of the intensity received, such as a camera. The detector DET may comprise any combination of one or more detector types.

By means of triangulation techniques, the height level at the measurement location MLO can be determined. The detected height level is typically related to the signal strength as measured by the detector DET, the signal strength having a periodicity that depends, amongst others, on the design of the projection grating PGR and the (oblique) angle of incidence ANG.

The projection unit LSP and/or the detection unit LSD may include further optical elements, such as lenses and/or mirrors, along the path of the patterned beam of radiation between the projection grating PGR and the detection grating DGR (not shown).

In an embodiment, the detection grating DGR may be omitted, and the detector DET may be placed at the position where the detection grating DGR is located. Such a configuration provides a more direct detection of the image of the projection grating PGR.

In order to cover the surface of the substrate W effectively, a level sensor LS may be configured to project an array of measurement beams BE1 onto the surface of the substrate W, thereby generating an array of measurement areas MLO or spots covering a larger measurement range.

Various height sensors of a general type are disclosed for example in U.S. Pat. Nos. 7,265,364 and 7,646,471, both of which are incorporated in their entireties by reference. A height sensor using UV radiation instead of visible or infrared radiation is disclosed in U.S. Patent Application Publication No. US2010233600, which is incorporated herein in its entirety by reference. In PCT Patent Application Publication No. WO2016102127A1, which is incorporated herein in its entirety by reference, a compact height sensor is described which uses a multi-element detector to detect and recognize the position of a grating image, without needing a detection grating.

In the manufacture of complex devices, typically many lithographic patterning steps are performed, thereby forming functional features in successive layers on the substrate. A critical aspect of performance of the lithographic apparatus is therefore the ability to place the applied pattern correctly and accurately in relation to features laid down in previous layers (by the same apparatus or a different lithographic apparatus). For this purpose, the substrate is provided with one or more sets of marks. Each mark is a structure whose position can be measured at a later time using a position sensor, typically an optical position sensor. The position sensor may be referred to as "alignment sensor" and marks may be referred to as "alignment marks".

A lithographic apparatus may include one or more (e.g. a plurality of) alignment sensors by which positions of alignment marks provided on a substrate can be measured accurately. Alignment (or position) sensors may use optical phenomena such as diffraction and interference to obtain position information from alignment marks formed on the substrate. An example of an alignment sensor for in a lithographic apparatus is based on a self-referencing interferometer as described in U.S. Pat. No. 6,961,116, which is incorporated herein in its entirety by reference. Various enhancements and modifications of the position sensor have been developed, for example as disclosed in U.S. Patent Application Publication No. US2015261097, which is incorporated herein in its entirety by reference.

A mark, or alignment mark, may comprise a series of bars formed on or in a layer provided on the substrate or formed (directly) in the substrate. The bars may be regularly spaced and act as grating lines so that the mark can be regarded as a diffraction grating with a well-known spatial period (pitch). Depending on the orientation of these grating lines, a mark may be designed to allow measurement of a position along the X axis, or along the Y axis (which is oriented substantially perpendicular to the X axis). A mark comprising bars that are arranged at +45 degrees and/or −45 degrees with respect to both the X- and Y-axes allows for a combined X- and Y-measurement using techniques as described in U.S. Patent Application Publication No. US2009/195768, which is incorporated herein in its entirety by reference.

The alignment sensor scans each mark optically with a spot of radiation to obtain a periodically varying signal, such as a sine wave. The phase of this signal is analyzed, to determine the position of the mark and, hence, of the substrate relative to the alignment sensor, which, in turn, is fixated relative to a reference frame of a lithographic apparatus. So-called coarse and fine marks may be provided, related to different (coarse and fine) mark dimensions, so that the alignment sensor can distinguish between different cycles of the periodic signal, as well as the exact position (phase) within a cycle. Marks of different pitches may also be used for this purpose.

Measuring the position of the marks may also provide information on a deformation of the substrate on which the marks are provided, for example in the form of a substrate grid. Deformation of the substrate may occur by, for example, electrostatic clamping of the substrate to the substrate table and/or heating of the substrate when the substrate is exposed to radiation.

Figure 6:
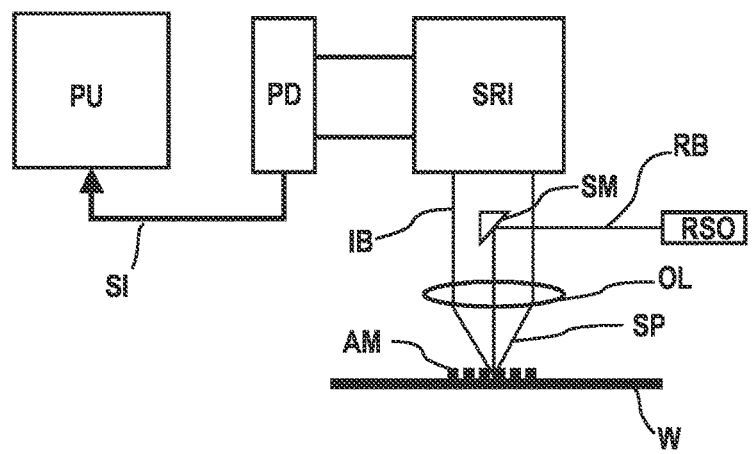
FIG. 6 depicts a schematic representation of an alignment sensor.

FIG. 6 is a schematic block diagram of an embodiment of an alignment sensor AS, such as is described, for example, in U.S. Pat. No. 6,961,116, which is incorporated herein in its entirety by reference. Radiation source RSO provides a beam RB of radiation of one or more wavelengths, which is diverted by diverting optics onto a mark, such as mark AM located on substrate W, as an illumination spot SP. In this example the diverting optics comprises a spot mirror SM and an objective lens OL. The illumination spot SP, by which the mark AM is illuminated, may be slightly smaller in diameter than the width of the mark itself.

Radiation diffracted by the mark AM is collimated (in this example via the objective lens OL) into an information-carrying beam IB. The term "diffracted" is intended to include zero-order diffraction from the mark (which may be referred to as reflection). A self-referencing interferometer SRI, e.g. of the type disclosed in U.S. Pat. No. 6,961,116 mentioned above, interferes the beam IB with itself after which the beam is received by a photodetector PD. Additional optics (not shown) may be included to provide separate beams in case more than one wavelength is created by the radiation source RSO. The photodetector may be a single element, or it may comprise a number of pixels, if desired. The photodetector may comprise a sensor array.

The diverting optics, which in this example comprises the spot mirror SM, may also serve to block zero order radiation reflected from the mark, so that the information-carrying beam IB comprises only higher order diffracted radiation from the mark AM (this is not essential to the measurement, but improves signal to noise ratios).

Intensity signals SI are supplied to a processing unit PU. By a combination of optical processing in the block SRI and computational processing in the unit PU, values for X- and Y-position on the substrate relative to a reference frame are output.

A single measurement of the type illustrated only fixes the position of the mark within a certain range corresponding to one pitch of the mark. Coarser measurement techniques are used in conjunction with this to identify which period of a sine wave is the one containing the marked position. The same process at coarser and/or finer levels may be repeated at different wavelengths for increased accuracy and/or for robust detection of the mark irrespective of the materials from which the mark is made, and materials on and/or below which the mark is provided. The wavelengths may be multiplexed and de-multiplexed optically so as to be processed simultaneously, and/or they may be multiplexed by time division or frequency division.

In this example, the alignment sensor and spot SP remain stationary, while it is the substrate W that moves. The alignment sensor can thus be mounted rigidly and accurately to a reference frame, while effectively scanning the mark AM in a direction opposite to the direction of movement of substrate W. The substrate W is controlled in this movement by its mounting on a substrate support and a substrate positioning system controlling the movement of the substrate support. A substrate support position sensor (e.g. an interferometer) measures the position of the substrate support (not shown). In an embodiment, one or more (alignment) marks are provided on the substrate support. A measurement of the position of the marks provided on the substrate support allows the position of the substrate support as determined by the position sensor to be calibrated (e.g. relative to a frame to which the alignment system is connected). A measurement of the position of the alignment marks provided on the substrate allows the position of the substrate relative to the substrate support to be determined.

Metrology tools MT, such as scatterometers, level sensors, and alignment sensors as described above, may use radiation to perform measurements. The radiation may be electromagnetic radiation. The radiation may be optical radiation, for example comprising wavelengths in the infrared, visible and/or ultraviolet parts of the electromagnetic spectrum. The radiation may comprise wavelengths in the deep ultraviolet (DUV), extreme ultraviolet (EUV) (e.g. 1 nm to 100 nm), and/or soft X-ray (SXR) (e.g. 0.1 nm to 10 nm) portions of the electromagnetic spectrum. A metrology tool MT may comprise or be connected to a radiation source. The type and quality of measurements performed by a metrology tool MT may be affected by the properties of the radiation used. Different types of radiation may be provided by different types of sources. Some sources may provide radiation at a single wavelength or in a narrow wavelength range. Some sources may provide radiation at multiple wavelength, for example over a broadband wavelength range. The physical effects and techniques used for generating radiation may differ depending on the wavelength(s) and/or the width of the wavelength range. For example, sources providing broadband radiation may use spectral broadening of narrowband or single wavelength radiation. Having a broadband radiation source may be advantageous, as it may enable performing a wider range of measurements, making use of the different wavelengths available. In order to provide a high quality broadband radiation source, it may be desirable to have a large amount of control over the radiation output by the source. The control may for example be to provide radiation over a desired wavelength range, and/or to control radiation beam properties such as intensity, size, and/or shape of the beam. Having increased control over the radiation output by a source may result in improved measurement results. Described herein are methods and assemblies for providing an improved broadband radiation source.

Broadband radiation may be generated using one or more nonlinear processes. Nonlinear processes may require high radiation intensities to be stimulated efficiently. This may for example be achieved by coupling high intensity radiation into an optical fiber. Inside the fiber core, strong localized intensities of radiation may be obtained. The optical fiber may be a photonic crystal fiber (PCF), which may achieve strong confinement of radiation, for example within the fiber core. This may contribute to providing localized high intensities of radiation. Nonlinear processes may further require a nonlinear medium in which a nonlinear process may occur. This may for example be a nonlinear crystal, or a nonlinear fluid, for example a nonlinear gas or gas mixture. A nonlinear medium may be provided inside a fiber. The fiber may be a hollow-core photonic crystal fiber (HC-PCF). A nonlinear medium, such as a nonlinear fluid, may be provided inside the hollow core. High intensity radiation may then be strongly confined within the hollow core of the optical fiber, allowing the high intensity radiation to interact with the nonlinear medium for generating broadband radiation. A hollow-core fiber, such as a hollow-core photonic crystal fiber, may for example be used for generating supercontinuum radiation from provided input radiation at one or more pump wavelengths.

A fiber with uniform properties along its length, for example a fiber with a uniform cross-section and uniform medium properties along its length, may not provide optimal conditions for broadband wavelength generation. This may for example be due to dispersion and/or optical non-linearities, meaning different wavelengths will experience different properties as the radiation propagates along the fiber length. In particular, uniform properties along a propagation direction of radiation confined within a fiber may affect effectiveness of generation of radiation with shorter wavelengths (e.g. UV, DUV, EUV, SXR radiation). Uniform properties along the fiber length may also negatively impact conversion efficiency of pump generation to broadband generation, and may also lead to differences in generated intensity across the broadband spectrum. It is therefore proposed herein to provide control of one or more conditions along a fiber to provide a non-uniform property for improving aspects of a broadband radiation generation process.

Figure 7:
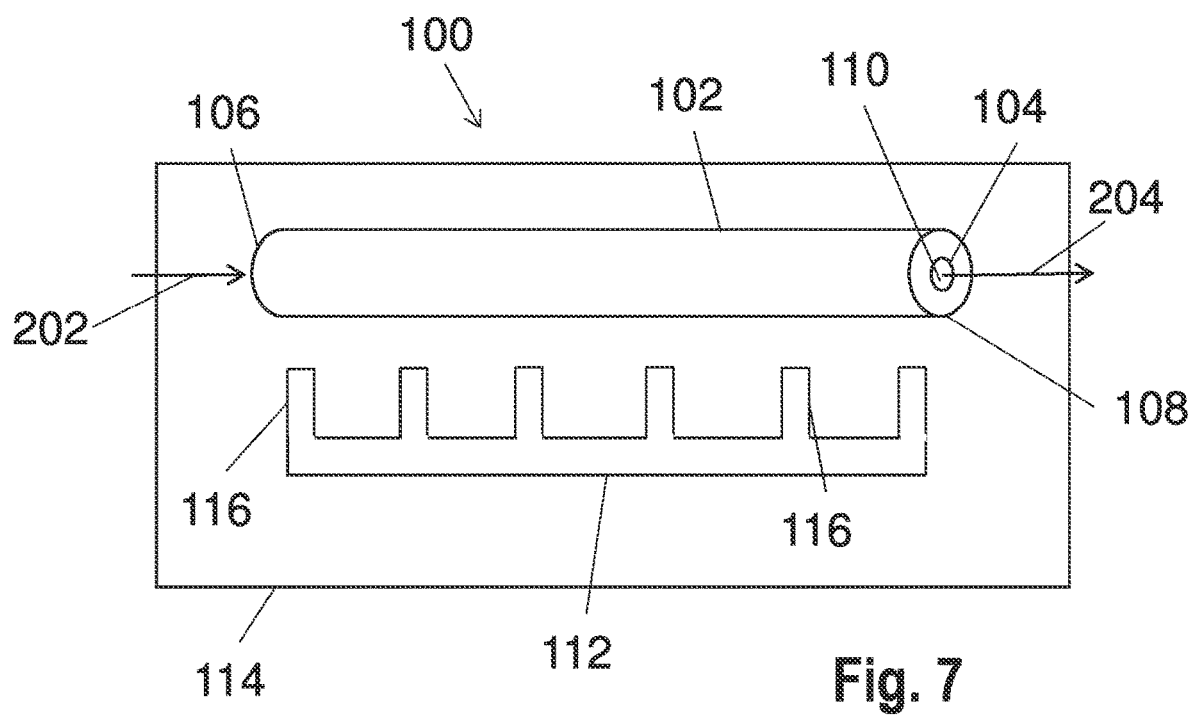
FIG. 7 depicts a schematic representation of a hollow-core fiber assembly.

Generally disclosed herein is a hollow-core fiber assembly for converting input radiation to broadband radiation. FIG. 7 depicts a schematic representation of a hollow-core fiber assembly 100. The hollow-core fiber assembly 100 comprises a fiber 102 with a hollow core 104 extending along a length of the fiber from an input end 106 to an output end 108 of the fiber. The input end 106 is configured to receive input radiation 202, and the output end 108 is configured to output broadband radiation 204. The hollow core 104 of the fiber may comprise a medium 110. The fiber 102 with the hollow core 104 may also be referred to as a hollow-core fiber 102. The conversion from input radiation 202 to broadband radiation 204 may comprise generation of broadband radiation 204 through interaction of the input radiation 202 with the medium 110. The assembly further comprises a density control system 112 configured to control a density profile of the medium 110 along at least a part of the length of the fiber 102. The density profile may be controlled in dependence of a desired zero dispersion wavelength profile along the at least a part of the length of the fiber 102. The desired zero dispersion wavelength profile is typically associated with a desired characteristic associated with the wavelength spectrum of the broadband radiation 204, and/or a conversion efficiency of the input radiation to the broadband radiation 204. Hence the density profile may be controlled alternatively in dependence of the characteristic associated with the wavelength spectrum of the broadband radiation 204, and/or the conversion efficiency of the input radiation to the broadband radiation 204. The fiber 102 may optionally be provided inside a reservoir 114.

An advantage of providing a hollow-core fiber assembly with a density control system, is that the density of the medium may differ along the length of the fiber for providing one or more non-uniform properties along at least a part of the fiber. The density profile of the fiber may be set to affect the generated broadband radiation. The characteristic associated with the wavelength spectrum may be seen as a property or parameter that is able to tune the radiation spectrum. The characteristic may be associated with the dispersion profile (typically the zero dispersion wavelength profile) of the hollow-core fiber assembly, as the dispersion may be used to tune the radiation spectrum. Based on a dispersion profile of the assembly, one or more other properties, such as the zero-dispersion wavelength profile, and/or the group velocity may be derived. Examples of characteristics which may be affected include for example the wavelength range of the broadband radiation and/or the intensity generated for different wavelengths across the broadband wavelength range. The controlled density profile may also affect a conversion efficiency from the input radiation to broadband output radiation for some or all of the broadband radiation wavelength range. The density profile may further be controlled to reduce noise in the output broadband radiation.

The conversion of input radiation to broadband output radiation may comprise supercontinuum generation of radiation inside the hollow-core of the fiber. The supercontinuum generation may comprise a process initiated by modulation instability. In an example implementation, modulation instability may be considered as occurring in two separate stages.

In a first stage the input radiation may be converted into a soliton shower in an anomalous dispersion regime, that is to say, a dispersion regime in which $\beta_2<0$, wherein $\beta_2$ is proportional to the second derivative of the index of refraction n as a function of wavelength. This may occur in a first portion along the length of the hollow-core fiber, for example along the first 10-15 cm of the hollow-core fiber. A soliton is a solution to the nonlinear wave equation. An interaction between the linear dispersion and the design of the fiber, and nonlinear effects inside the fiber may affect the dispersion experienced by the soliton inside the fiber. Some of the energy associated with the solitons inside the fiber may extend into the normal dispersion regime ($\beta_2>0$, index of refraction n decreases with increasing wavelength). In a second stage, the energy in the normal dispersive regime may excite dispersive waves (i.e. non-soliton wave packets). The dispersive waves may be excited at different wavelengths from the pump wavelength(s). The excited waves may comprise waves with wavelengths substantially shorter than the soliton wavelengths.

In a fiber with uniform properties along its length, it may be challenging to satisfy the conditions required to achieve and/or optimize the process of supercontinuum radiation generation described above. Some of the conditions that may be challenging to meet may include obtaining conditions in which the zero dispersion wavelength for the hollow-core fiber falls in a range suitable for soliton continuum formation. For efficient formation of a modulation instability initiated soliton continuum, it may be desirable for the zero dispersion wavelength of the hollow-core fiber to be at or near the wavelength of the input radiation. The zero dispersion wavelength should further fall in the anomalous dispersion regime so that a soliton continuum may be formed. It is also desirable that the dispersion profile for the hollow-core fiber is relatively flat around the zero-dispersion wavelength, as the phase matching conditions may be met or approximated for a wider range of wavelengths when the dispersion profile is more flat. This closer approximation for a wider range of wavelengths may lead to a more efficient supercontinuum generation for a wider range of wavelengths.

Another condition for supercontinuum radiation which may be challenging to meet may be achieving group matching between the solitons and dispersive waves to be generated. In order for the soliton continuum to transfer energy efficiently to a dispersive wave, the soliton and the dispersive wave should be group velocity matched. The group velocity matching conditions are affected by the dispersion of the fiber. Dispersion inside the hollow-core fiber may be affected by the design of the fiber itself, as well as the materials of the fiber and the medium inside the hollow core. However, the dispersive properties are relatively constrained, meaning design changes may have a limited effect on the resulting dispersion. Achieving group velocity matching may also be more difficult when the wavelength difference between the input wavelength and the generated dispersive wavelength is greater. The input radiation may have longer wavelength(s) than the generated radiation of interest. Input radiation may for example comprise one or more wavelengths in the infrared portion of the spectrum (e.g. at 1550 nm). As a result, it may be more difficult to meet and/or approximate group velocity matching for shorter generated wavelengths.

Furthermore, for shorter wavelengths, e.g. DUV, EUV, and/or SXR wavelengths of 250 nm or below, the dispersion curve and slope may become dominated by the dispersion properties of the medium, which may deviate significantly from a desired flat dispersion curve configuration. The dispersion curve may steepen for shorter wavelengths. As a result, short wavelengths may experience stronger dispersion inside the hollow-core fiber with uniform properties along its length. Next to the increased dispersion inside the hollow-core fiber, a steeper dispersion curve also reduces the wavelength range along which group velocity matching is met and/or approximated. In order to compensate for the dispersion, a non-uniform design may be provided along at least a part of the length of the fiber. For example, to achieve group velocity matching along the length of the fiber, a smaller core cross-sectional width (e.g. diameter) may be provided at the output end of the fiber compared to the input end of the fiber, to compensate for dispersion. Providing a non-uniformity along at least a part of the length of the hollow-core fiber may address the dispersion present for shorter wavelengths. This may make supercontinuum generation more efficient for shorter wavelengths. As a result, the generated wavelength range may shift or be improved for wavelengths in the UV, DUV, EUV, and/or SRX portions of the spectrum.

Another condition for supercontinuum radiation which may be challenging to meet may be how to achieve dispersive wave trapping for increased efficiency. Under the right conditions, a dispersive wave generated by a soliton, may be trapped by that soliton. The trapped wave and soliton may propagate along the fiber together. This may increase the amount of interaction between the soliton and the dispersive wave, meaning the transfer of energy from the soliton to the wave may be significantly increased. For dispersive trapping to occur, the group velocity of the soliton should decrease as it propagates along the fiber. As a soliton propagates along the fiber, it may self-shift to longer wavelengths. The associated dispersive wave generated from the soliton may conversely shift to shorter wavelengths. In solid core fibers, this decrease in group velocity may be achieved as a result of a Raman self-frequency shift effect, in which energy in the soliton spectrum is transferred from shorter to longer wavelengths. In some hollow-core fibers, for example noble-gas filled hollow-core fibers, this Raman effect may be absent. A shift to longer wavelengths and associated reduction in group velocity may still take place as the radiation travels along a uniform hollow-core fiber. However, the amount of group velocity decrease may be limited, leading to limited support for dispersive wave trapping. In order for dispersive wave trapping to occur, at least a part of the fiber may be given a non-uniform design to encourage a decrease in group velocity for radiation propagating through the fiber. This may for example be achieved by down-tapering the fiber, e.g. decreasing the cross-sectional width (e.g. diameter) of the core of the fiber between the input end and the output end of the fiber.

Another condition for supercontinuum radiation which may be challenging to meet may be soliton energy matching. As a soliton propagates along the length of the fiber, it may lose energy to the dispersive wave it is generating and/or propagation losses inside the fiber. In order to increase supercontinuum generation of radiation by the soliton, it may be desirable to maintain the soliton order. For example, it may be desirable to not perturb the soliton, and to reduce losses for the soliton not related to dispersive wave generation. One example way in which to maintain the soliton order may be to increase the non-linearity experienced by the soliton as it propagates along the fiber, without changing the dispersive properties of the fiber. This may for example be achieved by having a non-uniform profile of the medium density and/or the fiber structure/design along the length of the fiber.

Based on the challenges relating to meeting and/or improving supercontinuum generation described above, providing a non-uniform density profile along at least a part of a hollow-core fiber may be used to improve the efficiency of, and/or control, the supercontinuum generation process. A characteristic associated with the wavelength spectrum of the broadband radiation may therefore comprise one or more selected from: the zero dispersion wavelength (profile), the group velocity profile along the fiber, and/or a profile of a dispersion curve for radiation propagating along the fiber. Tuning the dispersion (zero dispersion wavelength) profile and nonlinearity of the hollow-core fiber assembly may in turn affect the wavelength range of generated radiation. The conversion efficiency from input radiation to broadband radiation may improve for some or all of the wavelengths in the broadband radiation range.

The density control system of the hollow-core fiber assembly may provide the non-uniform conditions along at least a part of the fiber. Having a changing medium density along at least a part of the length of a hollow core of a fiber may modify the non-linear and/or dispersive properties along that length of fiber. Changing the density of the medium by controlling the medium itself may introduce a non-uniform profile of non-linear and dispersive properties (such as the zero dispersion wavelength profile) along the at least part of the length of the fiber without having to change the cross-section along that length. However, it is possible to vary the design of a cross-section of the fiber, for example a hollow-core PCF, in addition to or as an alternative to controlling the medium in order to introduce non-uniform non-linear and/or dispersive properties inside the fiber.

Negative density gradients of the medium may be expressed in terms of pressure. A negative pressure gradient may have a change in pressure from an initial pressure value at a first location along the hollow-core fiber assembly to a lower pressure value at a second location along the hollow-core fiber assembly. The second location is further along the propagation direction of the fiber than the first location, so that propagating radiation experiences a negative density gradient. Initial pressure values may for example be in the range of 5-60 bar, e.g. 5 bar, 10 bar, 20 bar, 30 bar, 40 bar, 50 bar, 60 bar. Lower pressure values are lower than the associated initial pressure value, and may for example be in the range of 0-50 bar, e.g. 0 bar, 5 bar, 10 bar, 20 bar, 30 bar, 40 bar, 50 bar, wherein the lower pressure value is lower than the associated initial pressure value. Example pressure gradient curves between the first and second location may comprise a straight line, a square root, a parabola, or any user defined profile. The profile may be controlled by a density control system described in more detail below.

Figure 8:
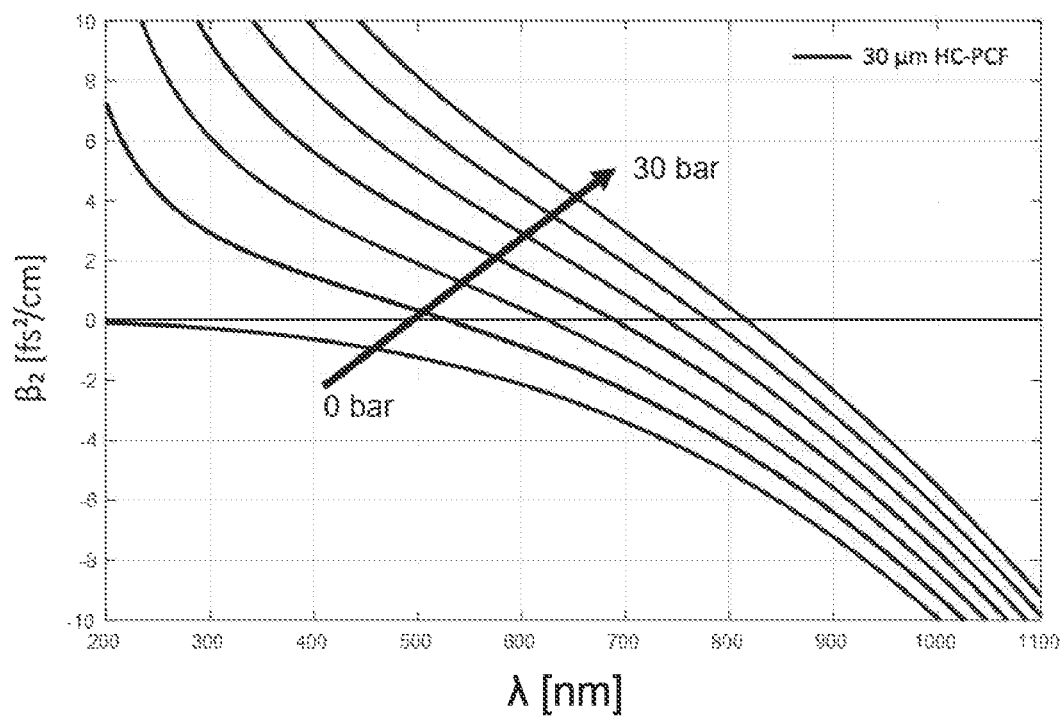
FIG. 8 depicts a graph showing exemplary dispersion profiles for hollow-core photonic crystal fibers.

Proposed herein is to introduce a negative density gradient profile along the at least a part of the length of the fiber. The negative gradient density profile can be used to extend the wavelength range of modulation instability controlled broadband radiation generation to shorter wavelengths. A negative gradient density profile may also be used to support dispersive wave trapping by solitons. Generally, by controlling the density gradient profile along at least a part of the fiber, the dispersion (zero dispersion wavelength profile) and non-linearity inside the fiber can be tuned, which may affect the supercontinuum generation process. FIG. 8 shows a graph depicting exemplary dispersion profiles for hollow-core photonic crystal fibers filled with argon gas at different pressures. As can be seen on the graph, the zero dispersion wavelength inside a hollow-core fiber 102 may be lower for lower densities of the medium 110. Introducing a negative gradient density profile along a length of fiber may therefore support a transfer of energy to shorter wavelengths. Soliton trapping, which is also supported by a negative gradient density profile, may also contribute to a higher conversion efficiency to broadband radiation at shorter wavelengths, for example in the UV, DUV, EUV and/or SXR parts of the spectrum.

As described above, including a taper in the fiber 102 properties, for example by providing a negative density gradient profile, and/or by changing the design of the cross-section of the fiber (e.g. a non-uniform profile of the cross-sectional width (e.g. diameter) of the hollow core 104), may lead to an increase in conversion efficiency for shorter wavelengths. This may in turn result in a more equal intensity distribution across the generated wavelength range (i.e. increased flatness of the generated broadband spectrum), compared to assemblies without tapered fiber 102 properties. The increased conversion efficiency in the shorter wavelength portion of the generated spectrum may also lead to an increased overall conversion efficiency.

The medium 110 may comprise a gas, or a gas mixture. The medium 110 may enable and/or cause spectral broadening when radiation interacts with the medium inside the fiber. The medium 110 may comprise hydrogen ($H_2$). The medium 110 may comprise a noble gas (e.g. argon Ar, helium He, neon Ne, krypton Kr, xenon Xe). The medium may comprise a molecular gas (e.g. nitrogen ($N_2$), oxygen ($O_2$).

The fiber 102 may be provided inside a resealable reservoir 114. In some implementations the whole fiber may be provided inside a reservoir 114, for example as depicted in FIG. 7. The reservoir may be configured to contain the medium. The reservoir 114 may comprise a medium control system for controlling one or more properties of the medium (e.g. composition of the medium, pressure of the medium). In other implementations, the input end 106 and the output end 108 of the fiber 102 may be provided inside separated sections of reservoir 114, or in separate reservoirs. This may allow one or more properties of the medium to be controlled separately at the input end 106 and output end 108 of the fiber 102. For example, the pressure of the medium 110 provided at the input end 106 may be different to the pressure of the medium 110 at the output end 108, for providing a non-uniform medium property along the length of the fiber 102.

The density control system 112 may be provided inside or outside of the reservoir 114. The density control system 112 may provide a pressure gradient of the medium 110 inside the hollow core 104 of the fiber 102 along at least a portion of the length of the fiber 102. This may for example be achieved by providing the medium 110 with a different pressure at the input end 106 and the output end 108 of the fiber 102. This may for example be achieved by using one or more external sources to supply a component(s) forming the medium 110. These sources may be used to control the pressure of the medium 110 inside the reservoir 114 at the input end and the output end of the fiber. However, using external sources may introduce challenges, for example downtime of the assembly if an external source needs to be replenished/replaced.

The density control system 112 may comprise a temperature control system configured to control a temperature along the at least a part of the length of the fiber. The temperature control system may introduce a temperature profile along the length of the fiber, which may in turn affect the density of the medium 110. The temperature control system may comprise a plurality of temperature setting devices 116 configured to locally supply heat at a plurality of locations along the length of the fiber 102. The temperature control system 112 may comprise or be connected to one or more processors for setting the temperature control properties at each of the temperature setting devices 116.

The temperature setting devices 116 may be provided external to the fiber 102, in the vicinity of the fiber 102 for locally heating up the medium 110 inside the hollow core 104 of fiber 102. The temperature setting devices 116 may indirectly heat up medium 110 inside the hollow core 104 by locally heating the fiber 102. Alternatively or additionally, the temperature setting devices 116 may directly supply heat to medium 110 without heating up the fiber 102 itself, for example using an alternating electric field or an electromagnetic field. Example temperature setting devices include for example resistive heating elements, dielectric heating elements, Peltier elements, fan coolers, and/or liquid coolers. An example temperature control system is described in Netherlands Patent Application Publication No. NL2023533, which is incorporated herein in its entirety by reference.

The fiber 102 may be a photonic crystal fiber PCF, such as a hollow-core photonic crystal fiber HC-PCF. An advantage of using a photonic crystal fiber 102 may be that it is able to achieve strong confinement of radiation inside the core. This may in turn achieve high local radiation intensity for increasing the efficiency of the non-linear processes contributing to spectral broadening of radiation for forming broadband radiation. The photonic crystal fiber may comprise a plurality of microstructures forming a photonic crystal for achieving strong confinement inside the core 104 of the fiber 102. The microstructure may form a single ring of structures surrounding the hollow core 104. The microstructures may comprise a plurality capillaries surrounding the hollow core 104. In an example implementation, a single ring of capillaries surrounds the hollow core 104 of fiber 102.

In some implementations in which the cross-sectional width (e.g., diameter) of the hollow core of the fiber is non-uniform along at least a portion of the length of the fiber, the design of the photonic crystal microstructures may also be varied (e.g. cross-sectional width (e.g., diameter) and/or wall thickness of capillaries changes along the length). In other implementations, the cross-sectional width of the hollow core may be varied, while the size of the microstructures is kept substantially the same (e.g. cross-sectional width and wall thickness of capillaries is kept substantially constant). In the latter case, the position of the microstructures relative to each other may change along the length of the fiber in order to accommodate the changing cross-sectional width of the hollow core 104.

A non-uniform cross-sectional width profile along at least a portion of the length of the fiber may also be used for controlling a characteristic associated with a wavelength spectrum and/or a conversion efficiency of input to broadband radiation. In assemblies wherein a non-uniform cross-sectional width is provided to control a wavelength and/or conversion efficiency inside the fiber, a fiber with a solid core may be provided as part of the assembly instead of a fiber with a hollow core 104.

A fiber with a non-uniform cross-sectional width of its core along its length may have a negative taper, also referred to as a down-taper profile, that is to say, the cross-sectional width of the core may decrease along the propagation direction of radiation along the length of the fiber (from input end to output end). The core cross-sectional width may have an initial value, and taper to a final value. An initial core cross-sectional width value may be in the range from 20 µm-60 µm, for example, 60 µm, 50 µm, 40 µm, 30 µm, 20 µm. A final core cross-sectional width value may be in the range from 10 µm to 50 µm, for example 50 µm, 40 µm, 30 µm, 20 µm, 10 µm. In case of a negative taper, the initial cross-sectional width value is higher than the associated final cross-sectional width value. The taper may comprise for example a linear profile or a polynomial based profile. A core cross-sectional width taper may reach across all or a portion of the length of the fiber. The taper profile may start at 0-80% of the total length of the fiber. The taper may end at 20-100% of the total length of the fiber, wherein the start of the taper is closer to the input end of the fiber than the end of the taper. It is also possible for a fiber to be provided with an up-taper profile, in which the cross-sectional width increases along the propagation direction of radiation inside the fiber.

The length of the fiber may be chosen so that it is sufficiently long for broadband generation to take place over a wavelength range of interest. The length of the fiber 102 may for example be in the range of 10 cm to 2 m. The length of the fiber 102 may be in the range of 10 cm to 40 cm. Fibers 102 with a length longer than 40 cm, or with a length longer than 2 m, may also be used, but it may be advantageous to provide a fiber with a shorter length that enables generation of radiation of the desired broadband range.

The input radiation coupled into the hollow-core fiber assembly 100 may be provided at one or more convenient wavelengths. The input radiation may for example be provided at a wavelength of readily available radiation sources. Example input radiation wavelengths include for example 1030 nm, 1550 nm, and/or wavelengths in the range of 700-800 nm.

The broadband radiation generated inside the hollow-core fiber assembly may comprise supercontinuum radiation. The supercontinuum radiation may comprise radiation over a continuous range of wavelengths. The broadband radiation may comprise radiation with wavelengths in the range of 350 nm to 3000 nm. The broadband radiation may comprise radiation with wavelengths in the range of 350 nm to 2000 nm. The supercontinuum radiation may comprise a continuous range of wavelengths at least in the range of 350 nm to 3000 nm, for example in the range of 350 nm to 2000 nm. The broadband/supercontinuum radiation may comprise a span of 100 nm or more, 200 nm or more, 300 nm or more, 400 nm or more or 500 nm or more, over the range of 350 nm to 3000 nm.

Further embodiments are disclosed in the list of numbered clauses below:

1. A hollow-core photonic crystal fiber (HC-PCF) assembly for converting input radiation to broadband radiation, the hollow core fiber assembly comprising:
  a micro-structured fiber with a hollow core extending along a length of the fiber from an input end configured to receive input radiation to an output end configured to output broadband radiation, wherein the hollow core of the fiber is configured to comprise a medium; and
  a density control system configured to control a density profile of the medium along at least a part of the length of the fiber to establish a desired zero dispersion wavelength profile along at least a part of the length of the fiber.
2. A hollow-core fiber assembly according to clause 1, wherein the desired zero dispersion wavelength profile is configured to enhance soliton trapping.

3. A hollow-core fiber assembly according to clause 1 or clause 2, wherein the desired zero dispersion wavelength profile is configured to extend the wavelength range of the broadband radiation generated by modulation instability.
4. A hollow-core fiber assembly according to any of clauses 1 to 3, wherein the desired zero dispersion wavelength profile is configured to enhance interaction between solitons and dispersive waves generated by the HC-PCF upon receiving the input radiation.
5. A hollow-core fiber assembly according to any of clauses 1 to 4, wherein the desired zero dispersion wavelength profile is configured to enhance conversion efficiency of the HC-PCF.
6. A hollow-core fiber assembly according to any of clauses 1 to 5, wherein the broadband radiation has a continuous range of wavelengths between 350 nm to 2000 nm.
7. A hollow-core fiber assembly according to any of clauses 1 to 6, wherein the density profile along the at least a part of the length of the fiber is a negative gradient profile.
8. A hollow-core fiber assembly according to any of clauses 1 to 7, wherein the density control system comprises a temperature control system configured to control a temperature along the at least a part of the length of the fiber.
9. A hollow-core fiber assembly according to any of clauses 1 to 8, wherein the density control system comprises a pressure control system configured to control a pressure along the at least a part of the length of the fiber.
10. A hollow-core fiber assembly according to any of clauses 1 to 9, wherein the diameter of the hollow core is varied along the at least a part of the length of the fiber.
11. A hollow-core fiber assembly according to clause 10, wherein the diameter of the hollow core is decreased along the at least a part of the length of the fiber.
12. A hollow-core fiber assembly according to any of clauses 1 to 11, wherein the medium comprises at least one selected from: helium, neon, argon, krypton, xenon, $O_2$ gas, $N_2$ gas.
13. A hollow-core fiber assembly according to any of clauses 1 to 12, wherein the hollow-core fiber is a single ring photonic crystal fiber.
14. A hollow-core fiber assembly according to clause 13, wherein the hollow-core fiber comprises a single ring of capillaries surrounding the hollow core.
15. A hollow-core fiber assembly according to any of clauses 1 to 14, wherein the broadband radiation comprises supercontinuum radiation.
16. A radiation source for outputting broadband radiation comprising a hollow-core fiber assembly according to any of clauses 1 to 15, and a pump radiation source configured to couple radiation at a pump wavelength into the hollow-core fiber for generating broadband radiation inside the fiber.
17. A method for converting input radiation to broadband radiation, the method comprising:
providing a micro-structured fiber with a hollow core extending along a length of the fiber from an input end to an output end, wherein the hollow core of the fiber comprises a medium;
directing input radiation into the hollow core fiber at the input end;
controlling a density profile of the medium along at least a part of the length of the fiber to establish a desired zero dispersion wavelength profile along at least a part of the length of the fiber; and
outputting broadband radiation at the output end.
18. A method according to clause 17, wherein the desired zero dispersion wavelength profile is configured to enhance soliton trapping.
19. A method according to clause 17 or clause 18, wherein the desired zero dispersion wavelength profile is configured to extend the wavelength range of the broadband radiation generated by modulation instability.
20. A method according to any of clauses 17 to 19, wherein the desired zero dispersion wavelength profile is configured to enhance interaction between solitons and dispersive waves generated by the HC-PCF upon receiving the input radiation.
21. A method according to any of clauses 17 to 20, wherein the desired zero dispersion wavelength profile is configured to enhance conversion efficiency of the HC-PCF.
22. A method according to any of clauses 17 to 21, wherein the broadband radiation has a continuous range of wavelengths between 350 nm to 2000 nm.
23. A method according to any of clauses 17 to 22, wherein the density profile along the at least a part of the length of the fiber is a negative gradient profile.
24. A method according to any of clauses 17 to 23, wherein the density profile is controlled by a temperature control system configured to control a temperature along the at least a part of the length of the fiber.
25. A method according to any of clauses 17 to 23, wherein the density profile is controlled by a pressure control system configured to control a pressure along the at least a part of the length of the fiber.
26. A method according to any of clauses 17 to 25, wherein the diameter of the hollow core is varied along the at least a part of the length of the fiber.
27. A method according to clause 26, wherein the diameter of the hollow core is decreased along the at least a part of the length of the fiber.
28. A method according to any of clauses 17 to 27, wherein the medium comprises at least one selected from: helium, neon, argon, krypton, xenon, $O_2$ gas, $N_2$ gas.
29. A method according to clause 17, wherein controlling the density profile comprises setting a negative gradient profile along the at least a part of the length of the fiber.
30. A metrology arrangement comprising a radiation source according to clause 16.
31. A hollow-core fiber assembly for converting input radiation to broadband radiation, the hollow core fiber assembly comprising:
a fiber with a hollow core extending along a length of the fiber from an input end configured to receive input radiation to an output end configured to output broadband radiation, wherein the hollow core of the fiber is configured to comprise a medium; and
a density control system configured to control a density profile of the medium along at least a part of the length of the fiber in dependence of a characteristic associated with the wavelength spectrum of the broadband radiation and/or a conversion efficiency of the input radiation to the broadband radiation.
32. A hollow-core fiber assembly according to clause 31, wherein the density profile along the at least a part of the length of the fiber is a negative gradient profile.
33. A hollow-core fiber assembly according to clause 31 or clause 32, wherein the density control system comprises a temperature control system configured to control a temperature along the at least a part of the length of the fiber.

34. A hollow-core fiber assembly according to any of clauses 31 to 33, wherein the diameter of the hollow core is varied along the at least a part of the length of the fiber.
35. A hollow-core fiber assembly according to clause 34, wherein the diameter of the hollow core is decreased along the at least a part of the length of the fiber.
36. A hollow-core fiber assembly according to any of clauses 31 to 35, wherein the medium comprises at least one selected from: helium, neon, argon, krypton, xenon, $O_2$ gas, $N_2$ gas.
37. A hollow-core fiber assembly according to any of clauses 31 to 36, wherein the hollow-core fiber is a single ring photonic crystal fiber.
38. A hollow-core fiber assembly according to clause 37, wherein the hollow-core fiber comprises a single ring of capillaries surrounding a hollow core.
39. A hollow-core fiber assembly according to any of clauses 31 to 38, wherein the broadband radiation comprises supercontinuum radiation.
40. A hollow-core fiber assembly according to any of clauses 31 to 39, wherein the broadband radiation comprises one or more wavelengths in the range of 350 nm to 3000 nm.
41. A radiation source for outputting broadband radiation comprising a hollow-core fiber assembly according to any of clauses 31 to 40, and a pump radiation source configured to couple radiation at a pump wavelength into the hollow-core fiber for generating broadband radiation inside the fiber.
42. A method for converting input radiation to broadband radiation, the method comprising:
providing a fiber with a hollow core extending along a length of the fiber from an input end to an output end, wherein the hollow core of the fiber comprises a medium;
directing input radiation into the hollow core fiber at the input end;
controlling a density profile of the medium along at least a part of the length of the fiber in dependence of a characteristic associated with the wavelength spectrum of the broadband radiation and/or a conversion efficiency of the input radiation to the broadband radiation; and
outputting broadband radiation at the output end.
43. A method according to clause 42, wherein controlling the density profile comprises setting a negative gradient profile along the at least a part of the length of the fiber.
44. A method according to clause 42 or clause 43, wherein controlling the density profile comprises controlling a temperature along the at least a part of the length of the fiber.
45. A metrology arrangement comprising a radiation source according to clause 41.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Although specific reference is made to "metrology apparatus/tool/system" or "inspection apparatus/tool/system", these terms may refer to the same or similar types of tools, apparatuses or systems. For example, an inspection or metrology apparatus that comprises an embodiment of the invention may be used to determine one or more characteristics of one or more structures on a substrate (e.g., a wafer). For example, an inspection apparatus or metrology apparatus that comprises an embodiment of the invention may be used to detect one or more defects of a substrate or defects of one or more structures on a substrate. In such an embodiment, a characteristic of interest of the structure on the substrate may relate to a defect in the structure, the absence of a specific part of the structure, or the presence of an unwanted structure on the substrate.

Although specific reference may have been made above to the use of embodiments of the invention in the context of optical lithography, it will be appreciated that the invention, where the context allows, is not limited to optical lithography and may be used in other applications, for example imprint lithography.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:
1. A hollow-core photonic crystal fiber (HC-PCF) assembly for converting input radiation to broadband radiation, the hollow core fiber assembly comprising:
a micro-structured fiber with a hollow core extending along a length of the fiber from an input end configured to receive input radiation to an output end configured to output broadband radiation, wherein the hollow core of the fiber is configured to comprise a medium; and
a density control system configured to control a density profile of the medium along at least a part of the length of the fiber to establish a desired varying zero dispersion wavelength profile along at least a part of the length of the fiber.
2. The assembly according to claim 1, wherein the desired zero dispersion wavelength profile is configured to enhance soliton trapping.
3. The assembly according to claim 1, wherein the desired zero dispersion wavelength profile is configured to extend the wavelength range of the broadband radiation generated by modulation instability.
4. The assembly according to claim 1, wherein the desired zero dispersion wavelength profile is configured to enhance interaction between solitons and dispersive waves generated by the HC-PCF upon receiving the input radiation.
5. The assembly according to claim 1, wherein the desired zero dispersion wavelength profile is configured to enhance conversion efficiency of the HC-PCF.
6. The assembly according to claim 1, wherein the broadband radiation has a continuous range of wavelengths between 350 nm to 2000 nm.
7. The assembly according to claim 1, wherein the density profile along the at least a part of the length of the fiber is a negative gradient profile.

8. The assembly according to claim 1, wherein the density control system comprises a temperature control system configured to control a temperature along the at least a part of the length of the fiber.

9. The assembly according to claim 1, wherein the density control system comprises a pressure control system configured to control a pressure along the at least a part of the length of the fiber.

10. The assembly according to claim 1, wherein the cross-sectional width of the hollow core is varied along the at least a part of the length of the fiber.

11. The assembly according to claim 10, wherein the cross-sectional width of the hollow core is decreased along the at least a part of the length of the fiber.

12. The assembly according to claim 1, wherein the medium comprises at least one selected from: helium, neon, argon, krypton, xenon, $O_2$ gas, $N_2$ gas.

13. The assembly according to claim 1, wherein the hollow-core fiber is a single ring photonic crystal fiber.

14. The assembly according to claim 13, wherein the hollow-core fiber comprises a single ring of capillaries surrounding the hollow core.

15. The assembly according to claim 1, wherein the broadband radiation comprises supercontinuum radiation.

16. A radiation source for outputting broadband radiation, the radiation source comprising:
the assembly according to claim 1, and
a pump radiation source configured to couple radiation at a pump wavelength into the hollow-core fiber for generating broadband radiation inside the fiber.

17. A metrology arrangement comprising the radiation source according to claim 16.

18. A method for converting input radiation to broadband radiation, the method comprising:
directing input radiation into an input end of a micro-structured fiber with a hollow core extending along a length of the fiber from the input end to an output end, wherein the hollow core of the fiber comprises a medium;
controlling a density profile of the medium along at least a part of the length of the fiber to establish a desired varying zero dispersion wavelength profile along at least a part of the length of the fiber; and
outputting broadband radiation at the output end.

19. The method according to claim 18, wherein the desired zero dispersion wavelength profile is configured to enhance soliton trapping.

20. The method according to claim 18, wherein the desired zero dispersion wavelength profile is configured to extend the wavelength range of the broadband radiation generated by modulation instability.

21. A hollow-core photonic crystal fiber (HC-PCF) assembly for converting input radiation to broadband radiation, the hollow core fiber assembly comprising:
a micro-structured fiber with a hollow core extending along a length of the fiber from an input end configured to receive input radiation to an output end configured to output broadband radiation, wherein the hollow core of the fiber is configured to comprise a medium; and
a density control system configured to control a density profile of the medium along at least a part of the length of the fiber to establish a desired zero dispersion wavelength profile along at least a part of the length of the fiber, wherein the desired zero dispersion wavelength profile is configured to enhance soliton trapping or the desired zero dispersion wavelength profile is configured to enhance interaction between solitons and dispersive waves generated by the HC-PCF upon receiving the input radiation.

22. The assembly according to claim 21, wherein the desired zero dispersion wavelength profile is configured to enhance soliton trapping.

23. The assembly according to claim 21, wherein the desired zero dispersion wavelength profile is configured to enhance interaction between solitons and dispersive waves generated by the HC-PCF upon receiving the input radiation.

* * * * *